Patented Feb. 27, 1934

1,949,111

UNITED STATES PATENT OFFICE 1,949,111

SURGICAL SUTURE

George M. Randall, Daytona Beach, Fla., assignor to Plastic Products, Inc., Daytona Beach, Fla., a corporation of Florida No Drawing. Application July 7, 1930
Serial No. 466,040

5 Claims. (Cl. 128—335.5)

This invention relates to surgical sutures and ligatures employed for the purpose of the ligation of blood vessels and the stitching together of incised or accidental wounds, or the like. It has particular reference to sutures of the type intended to be gradually absorbed into the living tissue in connection with which it is employed. The invention has to do not only with the suture or ligature itself, but with an improved method of producing the same as well.

Sutures of various forms have been employed heretofore for the purposes specified for more than 2000 years. Various forms of animal tissue, as well as silk thread, linen thread, and the like, have been used for a long time. One difficulty which has been encountered in the use of animal tissue, and one which had for many years been regarded as a necessary evil of sutures of this type, has been the danger of the development and spreading of infection in the wound stitched together by the suture. In more recent times steps have been taken to insure against such infections by the proper sterilization of the materials employed in the suture. However, where animal tissues of various sorts, such as sheep gut and similar materials, are employed, it is extremely difficult to completely sterilize the tissue. It has been found that the upper few feet of the sheep's intestines constitute an ideal culture medium for bacteria of various sorts so that the latter multiplies at an enormous rate after the sheep has been slaughtered. Exercise of even the greatest care in the extermination of this bacteria has not always proved adequate.

In modern surgery the tendency has been to employ a suture in the stitching of wounds which will be automatically absorbed by the living tissue after the stitches have performed their intended function for a sufficient period of time. This time element varies considerably with various factors, such as the location of the wound, which determines the temperature, water content, and general structural character of the parts to be stitched, the condition of the blood, etc. Sutures have accordingly been developed for the intended purpose of becoming absorbed into the system after a predetermined period. However, due to the variable qualities of the animal tissues, such as ligaments, tendons, gut, etc. heretofore employed for this purpose, it has been impossible to specify very accurately the time required for the absorption of the suture. A single suture or ligature may vary in its absorption qualities at different points throughout its length. This is for the reason that heretofore it has been the general practice to retain the animal tissue in its natural or original state insofar as its fibrous or cellular structure is concerned. Various methods have been proposed and employed for separating the tissues into fine fibers and treating them to destroy the bacteria and to toughen or strengthen the tissues. In most instances the fibers have been twisted, braided or woven into a filament or ribbon of suitable dimension either before or after treatment. In all such cases the final product contains the original structure of the animal tissue and the suture is in effect constructed around these tissues.

It has been a primary object of my invention to overcome the objections heretofore encountered in the production and use of the suture and ligature by the provision of means for absolutely and completely sterilizing the animal tissue employed and for so accurately regulating the nature and proportion of these tissues entering into a given suture that the desired absorption characteristics may be carried into the final product. In the conduct of my process and the production of the improved form of suture, the identity of the cells and fibers of the original tissues is completely destroyed and they are put into a state in which sterilization and distribution of the same throughout a filamentary structure is very readily permitted. In the accomplishment of the desired ends I contemplate the formation of a suitable solution or colloidal suspension of the selected tendons and ligaments or other animal tissues and the use of this solution in conjunction with one or more other solutions and colloidal suspensions or mixtures containing ingredients which will serve as a binder and as a base material for the suture. In this way just so much of the absorbable animal tissue may be introduced into the final product as may be required to give the desired duration to the stitch. It will be understood that the base material is of such a nature as not to be readily absorbed by the living tissue and may remain indefinitely or is disposed of only after the composite structure is broken down by the absorption of the animal tissue content of the suture. Thus, where a wound to be stitched is of such a nature as to require only a brief period for healing, the percentage of the absorbable component employed in the suture will be relatively great whereas sutures requiring tensile strength for longer periods the animal tissue content will be reduced. It will be apparent that this method of handling or treating the animal tissue has the advantage of permitting complete destruction of the bacteria which it might carry due to the fact that the cells carrying the bacteria are broken down and may be reached by appropriate antiseptic solutions. Furthermore, absolute homogeneity of the final product may be controlled in this way. By dealing with large batches of material, as by the use of a large vat containing animal tissues in solution, definite absorption characteristics may be determined for this entire batch and the thousands of feet of suture derived from the same source may be made absolutely uniform throughout. In the production of a suitable suture from elements in solution in accordance with the present invention, I have found the following procedure to be quite satisfactory:

A quantity of suitable animal tissue is dissolved in a suitable solvent. I have found animal tissue in which collagen is an essential component, i. e. the white, fibrous tissue of the bovine specie, such as the ligamentum nuchae and other tendons and ligaments of said specie, forms an excellent base for that element of the suture to be absorbed. A solution of this tissue may be effected by the use of a 10% to 20% sodium sulphide aqueous solution, or by the use of acetone and similar solvents which serve to convert collagen into a gelatine.

In a separate container certain vegetable tissues, such as cotton fiber and other vegetable fibers having cellulose as the essential ingredient, are dissolved to form a solution of cellulose. For this purpose any of the solvents well known in the rayon industry, or in the manufacture of celluloid and the like, may be employed. For example a concentrated solution of calcium thiocyanate, or ammonical cupric oxide, may be used to produce a colloidal, gelatinous mass of suitable viscosity.

In a third container a solution of certain gum-resins, such as tragacanth and myrrh, or vegetable glue in water may be produced. The function of this third solution is to serve as a binder and it is necessary or desirable only when the ultimate product is in the form of a series of fine filaments twisted together. It is not altogether necessary even in connection with this type of suture. It may readily be omitted in any event and particularly where the final suture is in the form of a single strand of synthetic material. When employed, the gum-resins and the like do provide the additional function of aiding in the sterilization of the animal tissue but other substances may readily be employed for this purpose if any are required.

The three separate solutions mentioned above are then mixed in proper proportions, which will vary in accordance with the nature of the suture ultimately desired, depending upon the absorption qualities, tensile strength and the like sought. The quantity of cellulose may vary between 20% and 60% of the total mixture, preferably being in the neighborhood of 30% to 35% for sutures of ordinary duration and tensile strength. The gum-resins and the like whenever employed may constitute between 2% and 5% of the total mixture while the animal tissue solution will constitute the balance of the mixture. After the solutions have been properly blended into a suitable mechanical mixture, the material may be subjected to a filtering operation and if desired may be deaerated for the purpose of assisting a complete digestion of the ingredients in the solution and preparing the same for a spinning operation. In dissolving the animal tissue in the way mentioned, all of the bacteria content of the same will be destroyed but if desired additional antiseptics may be added to doubly insure complete sterilization of these tissues. When the several solutions have been properly mixed, the resulting mixture may be permitted to gravitate to a tank from which it may be forced by suitable air pressure through a perforated plate or spinneret of any well known construction, such as commonly employed in the rayon industry for the production of artificial silk thread and the like. It may include capillary glass tubes having ejecting orifices of appropriate diameter to reduce the filament to proper size or gauge. Upon leaving the spinneret the viscous material, in the form of finely spun threads or filaments, will be led into a suitable vat where coagulation or precipitation may take place. A solution of caustic soda may be employed in this vat to bring about the desired precipitation. The filament may be further hardened, if desired, and cured by passing it through a bath of alcohol or a bath of formaldehyde, or both in sequence. The filament thus produced is in one continuous strand which may be twisted and wound upon a spool or bobbin for ultimate disposition. Obviously, the strand will be absolutely homogeneous from beginning to end due to its production from the single uniform mixture in the way specified. In lieu of spinning the viscous mixture of cellulose and animal tissue compounds with or without the gum-resins in the way specified, the mixture may be formed into a suitable plastic or semi-solid mass and formed into a single filament or strand by extrusion through the use of hydraulic pressure, or the like, as is well known in the production of celluloid articles. In the extrusion of the thread, it will be forced or drawn through a die having an opening of appropriate dimension. Varying degrees of hardness and absorbability of the finished product may be brought about, as already stated, by varying the proportions of the various ingredients employed and also by the use of different types and concentrations of precipitating and hardening media. In lieu of the alcohol and formaldehyde for curing and hardening the filament, suitable solutions of potassium bichromate, tannic acid, chromic acid, or the like, may be employed. Seasoning of the finished product may, if desired, be brought about by proper heat treatment or exposure to the sun, or similar treatment.

While an illustrative form of the improved type of suture has been disclosed in considerable detail, and certain specific steps and reagents have been specified for the production of the new suture, it will be understood that numerous variations may be made in the ingredients, steps and treating materials or reagents employed without departing from the general spirit and scope of the invention. The terms employed herein have been used for the purpose of disclosing the nature of the invention and are not to be regarded as imposing any limitations on the scope thereof.

What I claim is:

1. A synthetic surgical suture comprising a thread of absorbable animal tissue in its original chemical state homogeneously distributed through a cellulose base material.

2. A synthetic surgical suture comprising 60 to 70% of animal tissue, 30 to 35% of a cellulose compound and 2 to 5% of an antiseptic binder formed into a continuous, homogeneous filament, adapted to be partially absorbed when employed as a suture.

3. A synthetic surgical suture comprising approximately 65% animal tissue, approximately 30% of a cellulose compound and approximately 5% of a binder including gum-resins, formed into a continuous homogeneous partially absorbable filament.

4. A method of producing a surgical suture which comprises dissolving animal tissue in a solvent therefor, forming a separate solution of a cellulosic material, mixing the two solutions in proportions to provide a predetermined absorption rate, forming the resulting mixture into a continuous filament, and subsequently treating the filaments to produce coagulation.

5. A method of producing a surgical suture which comprises dissolving animal tissue in a suitable solvent therefor, producing a cellulose solution, dissolving an antiseptic binder in a suitable solvent, mixing the resulting solutions in proportions to provide a predetermined absorption rate, and forming the mixture into a continuous filament.

GEORGE M. RANDALL.